United States Patent [19]

Takahashi

[11] Patent Number: 5,113,825
[45] Date of Patent: May 19, 1992

[54] ENGINE CONTROLLER

[75] Inventor: Keiichi Takahashi, Akashi, Japan

[73] Assignee: Shin Caterpillar Mitsubishi Ltd., Tokyo, Japan

[21] Appl. No.: 745,754

[22] Filed: Aug. 16, 1991

[30] Foreign Application Priority Data

Aug. 21, 1990 [JP] Japan ................. 2-86760[U]

[51] Int. Cl.⁵ .................. F02O 11/04; F02O 11/10; F02M 39/00
[52] U.S. Cl. ....................... 123/400; 123/373; 123/365
[58] Field of Search ............ 123/357, 365, 373, 376, 123/400, 403; 414/699

[56] References Cited

U.S. PATENT DOCUMENTS

| | | | |
|---|---|---|---|
| 2,450,113 | 9/1948 | Burchett | 123/403 X |
| 2,709,993 | 6/1955 | Kulhavy | 123/376 |
| 4,401,077 | 8/1983 | Earl | 123/376 |
| 4,526,060 | 7/1985 | Watanabe | 123/376 X |
| 4,892,071 | 1/1990 | Asayama | 123/400 X |
| 5,036,817 | 8/1991 | Tomikawa et al. | 123/400 X |
| 5,040,508 | 8/1991 | Watanabe | 123/400 X |

FOREIGN PATENT DOCUMENTS 0140447 8/1983 Japan .................. 123/400

Primary Examiner—Willis R. Wolfe
Attorney, Agent, or Firm—Wegner, Cantor, Mueller & Player

[57] ABSTRACT

An engine controller which is arranged to operate a governor through an actuator which is controllable either by an accelerator lever in an operator's station or by radio control. First and second levers are rotatably mounted on a shaft, and are biased respectively by a spring to turn in one direction. The first lever is connected to the governor by a wire in such a manner as to increase the engine speed when turned in a direction reverse to the biased direction. The second lever is connected to the accelerator lever by a second wire in such a manner as to rotate in the reverse direction when the accelerator lever is operated in the direction of acceleration. A pulley is mounted on the shaft, and a third lever is securely fixed to the pulley. The pulley is connected to the actuator by a third wire such that the pulley is rotated according to the rotation of the actuator. A rod is securely fixed to the first lever to transmit the reverse rotations of the second and third levers to the first lever.

6 Claims, 6 Drawing Sheets

ENGINE CONTROLLER

BACKGROUND OF THE INVENTION

1. Field of the Art

This invention relates generally to Diesel engine controllers, and more particularly to an engine controller suitable for application to Diesel engines construction machines such as hydraulic excavators, bulldozers, wheel loaders, tractors, motor scrapers, mobile cranes and the like.

2. Description of the Prior Art

The rotational speed of a Diesel engine, which is mounted on a hydraulic excavator or on a similar construction machine, is controlled by a governor. The governor controls the engine constantly at a speed desired by an operator irrespective of the engine load condition, or automatically controls its maximum or minimum speed. In transmitting operator's commands to the governor, it is the general practice to resort to a wire type transmission system which employs a wire to link an accelerator lever provided in the operator's station (cab) to the engine governor thereby transmitting a rotational or sliding movement of the accelerator lever to operate the governor.

On the other hand, from a standpoint of realizing remote control from a place other than the operator's station, recently there is a trend toward using an electric or fluid type transmission system which connects the accelerator lever with the governor by an electric system or by a hydraulic or pneumatic system.

However, the engine controllers with an electric or fluid type transmission system have inherent problems which often compel to stop the operation, e.g., troubles caused by disconnection and current leaks in case of the electric system and troubles caused by breakage of conduit in case of the fluid system.

SUMMARY OF THE INVENTION

It is therefore an object of the present invention to provide an engine controller of simple construction and high reliability, which can overcome the above-mentioned problems of the prior art and permits both direct manual control and remote control.

In accordance with an aspect of the present invention, there is provided an engine controller for controlling rotational speed of an engine, which includes: a governor for adjusting the rotational speed of the engine; an accelerator means provided at an operator's station; an actuator operated by radio control; a shaft; a support means for the shaft; a first lever means rotatably supported on the shaft; a first biasing means adapted to bias the first lever means to turn in one direction; a second lever means rotatably supported on the shaft; a second biasing means adapted to bias the second lever means to turn in said one direction; a pulley mounted on the shaft; a third lever means fixedly secured to the pulley; a first wire means operatively connecting the first lever means with the governor, the first wire means being linked to the first lever means in such a manner as to increase the engine speed when the first lever means is turned in the opposite direction or in a direction reverse to the afore-mentioned one direction; a second wire means operatively connecting the second lever means with the accelerator means, the second wire means being linked to the second lever means in such a manner as to turn the second lever means in the opposite direction when the accelerator means is operated in the direction of acceleration; a third wire means operatively connecting the pulley with the actuator in such a manner as to rotate the pulley in the afore-mentioned one direction or in the opposite direction according to the rotation of the actuator; and a rotation transmitting means adapted to transmit rotation to the first lever means to rotate same in the opposite direction when at least one of the second and third lever means is rotated in the opposite direction.

The above-mentioned shaft member is rotatably or non rotatably supported by the support means. In an arrangement in which the shaft member is rotatably supported on the support means, the pulley is fixedly mounted on the shaft member. On the contrary, in an arrangement in which the shaft member is non-rotatably supported by the support means, the pulley is rotatably mounted on the shaft member.

According to the present invention, a mechanical linkage by a wire means is provided between the governor and the first lever means, between the accelerator means and the second lever means, and between the actuator and the third lever means. As compared with an electric type transmission system or a fluid type transmission system using hydraulic pressure or other fluid medium, the mechanical transmission system which is constituted by wire means is more reliable because it is less susceptible to troubles and, should a trouble occur, it would be most unlikely to be so detrimental as to cause total loss of maneuverability.

Besides, the engine can be controlled either by direct operation of the accelerator means or by the radio control. It follows that, even if a trouble occurs to one of the accelerator lever and radio control transmission systems, the engine control can be continued through the other transmission system without inviting the worst condition, that is, shutdown of the operation.

The above and other objects, features and advantages of the present invention and the manner of realizing them will become more apparent, and the invention itself will best be understood from a study of the following description and the appended claims with reference to the attached drawings showing some preferred embodiments of the invention.

DESCRIPTION OF PREFERRED EMBODIMENTS

Figure 1:
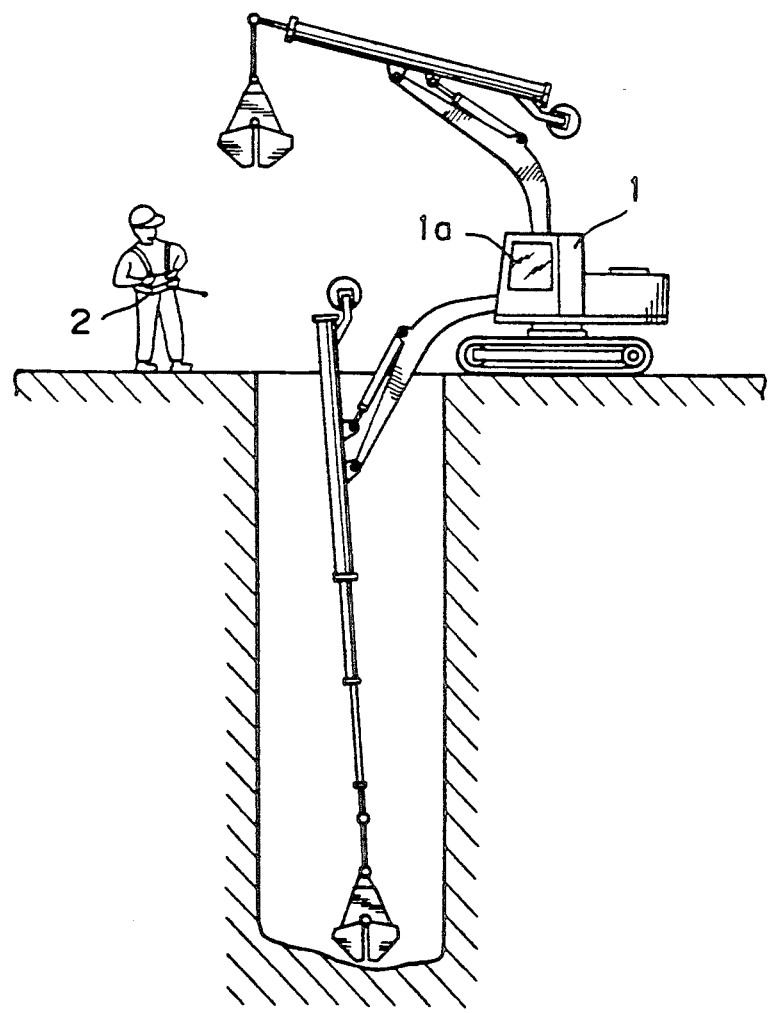
FIG. 1 is a schematic side view of a radio-controlled excavator with a telescopic arm, to which the present invention is applied.

Referring to FIG. 1, there is shown in outer view a radio-controlled excavator with a telescopic arm, which incorporates the present invention. The radio-controlled excavator 1 permits to control an excavating operation either by directly manipulating an operating lever in an operator's station (cab) 1a or by a radio controller 2 for wireless remote control. Similarly, remote control of the engine is possible through the radio controller 2 in addition to the control through an accelerator lever in the operator's station 1a. The engine controller of the present invention is applied to cope with both of the direct manual control and remote control.

Figure 2:
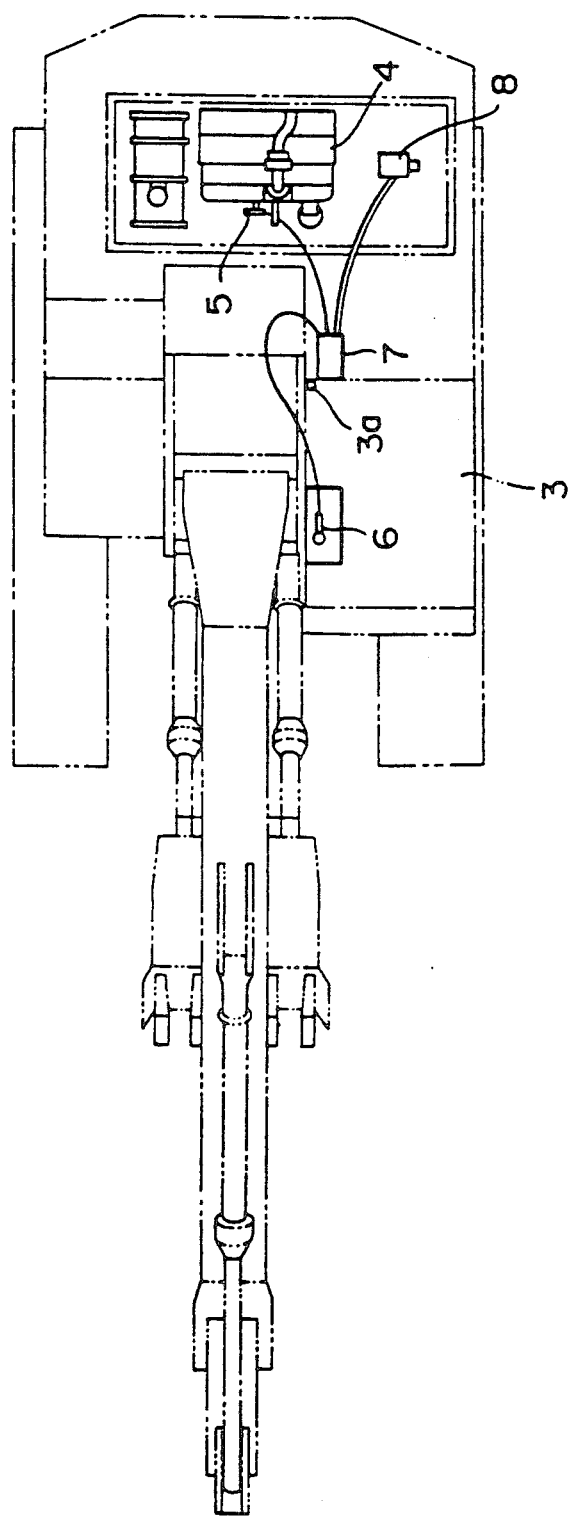
FIG. 2 is a schematic plan view of a hydraulic excavator to which the present invention is applied.
Figure 3:
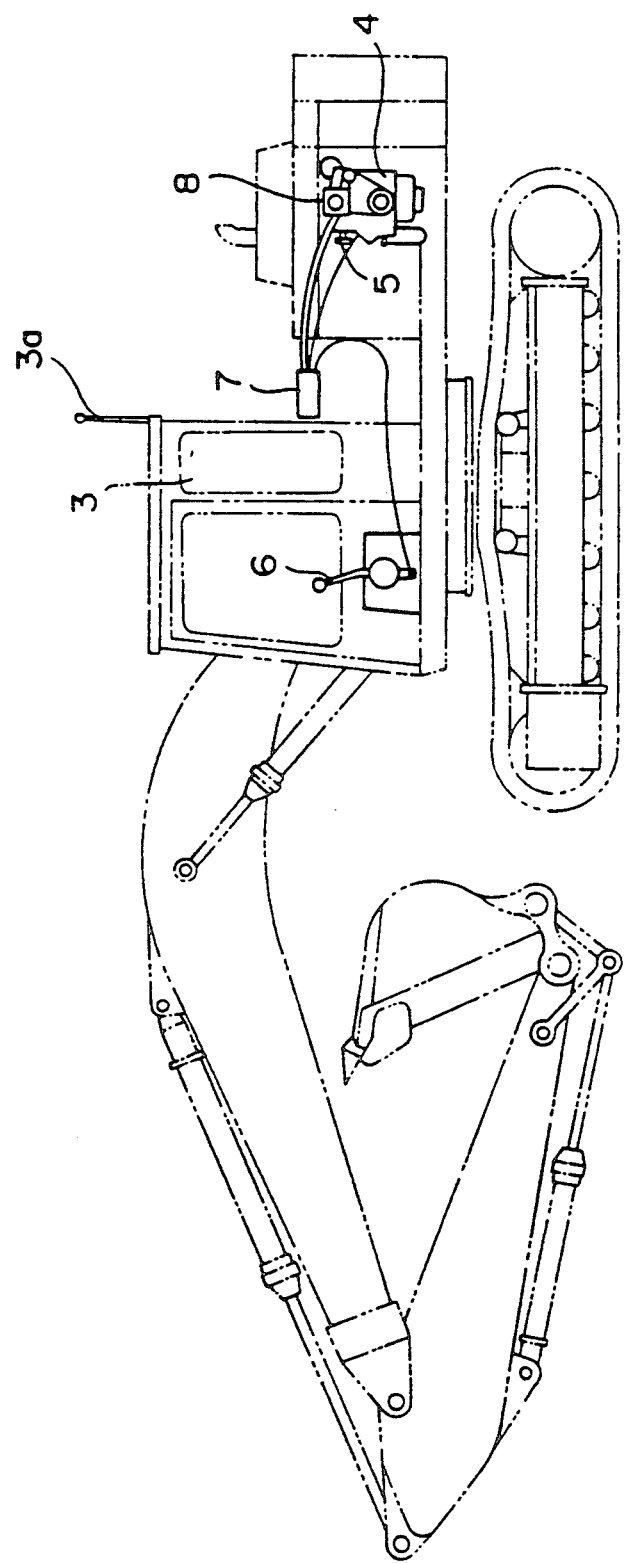
FIG. 3 is a schematic side view of the excavator of FIG. 2.

Referring to FIGS. 2 and 3, there is schematically shown a hydraulic excavator which incorporates the engine controller according to the invention. An engine 4 is mounted on a rear portion of the excavator, and a governor with a governor lever 5 is attached to the engine 4 to adjust the rotational speed of the engine. On the other hand, an accelerator lever 6 is provided in the operator's station 3, and a main controller 7 which controls the rotational speed of the engine is located rearward of the operator's station. Provided on one side of the engine 4 is an actuator 8 in the form of an electric motor or the like which is used for the remote control of the engine speed.

The accelerator lever 6 in the operator's station 3 is manipulated in order to alter the engine speed by direct manual control. In case of remote control, the radio wave from the radio controller is transmitted to the actuator 8 through an antenna 3a, thereby operating the main controller 7 to control the position of the governor lever 5, thus permitting to control the rotational speed of the engine 4 from a remote place.

Figure 4:
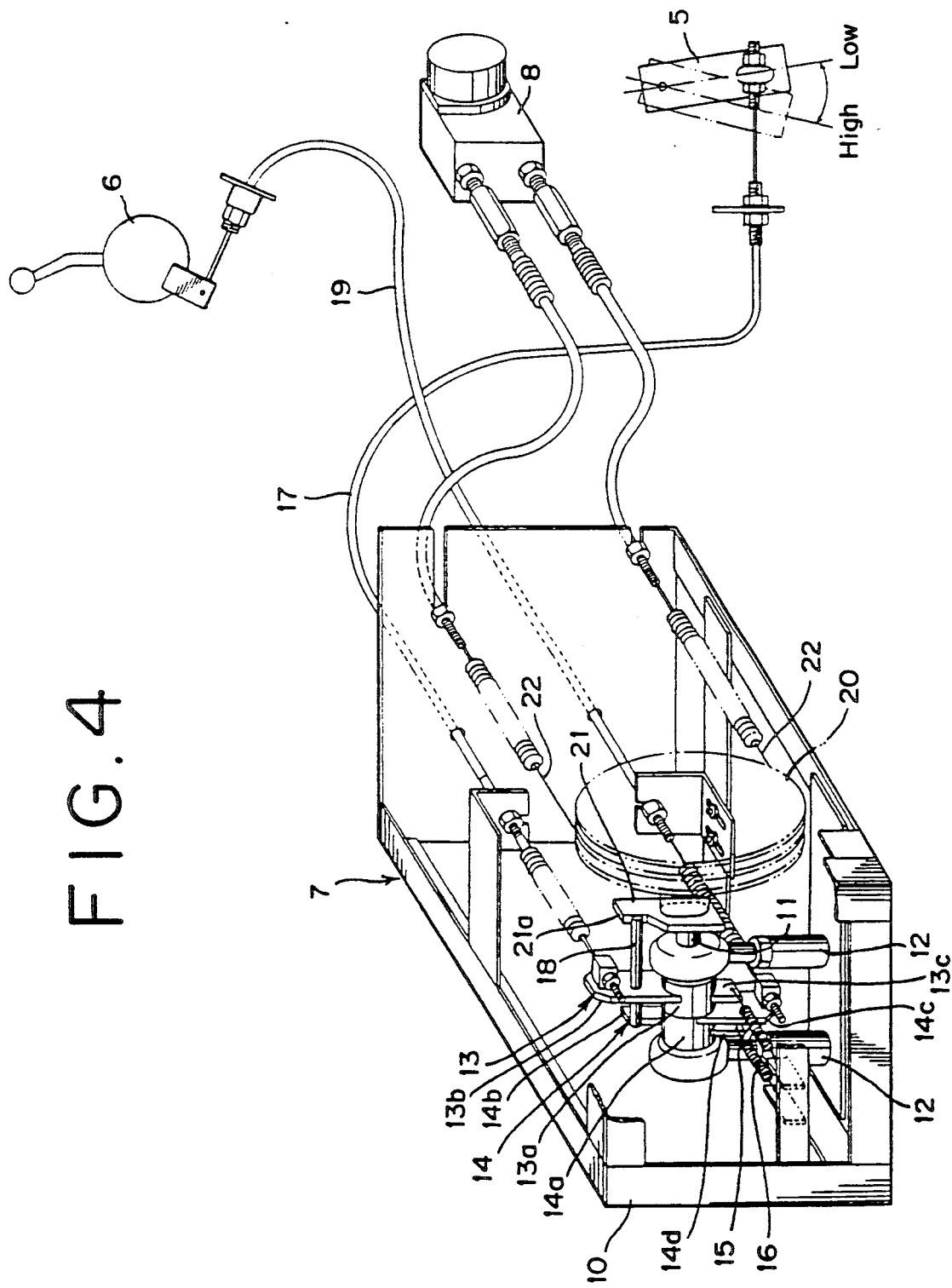
FIG. 4 is a partly cutaway perspective view of an embodiment of the invention, showing some component parts by imaginary lines for the sake of clear indication of the construction.

Now, referring to FIG. 4, there is illustrated the main controller 7 of the engine controller according to the present invention. A shaft 11 is rotatably mounted within a housing 10 of the main controller 7 through a pair of bearings 12. A first lever 13 and a second lever 14 are rotatably mounted on the shaft 11. The first lever 13 is constituted by a boss 13a which is rotatably fitted on the shaft 11, and arms 13b and 13c which are securely fixed to the boss 13a and extended therefrom in radially opposite directions. The second lever 14 is constituted by a boss 14a which is rotatably fitted on the shaft 11, an arm 14b which is securely fixed to the boss 14a to extend in the same direction as the arm 13b of the first lever 13, and arms 14c and 14d which are securely fixed to the boss 14a to extend in the same direction as the arm 13c of the first lever 13. A spring 15 is connected to the arm 13c of the first lever 13 to bias the first lever 13 in the clockwise direction. A spring 16 is connected to the arm 14d of the second lever 14 to bias the second lever 14 similarly in the clockwise direction.

The arm 13b of the first lever 13 is fixedly connected to one end of a wire 17, the other end of which is connected to the governor lever 5. Further, securely fixed to the arm 13b of the first lever 13 is a rod 18 which is extended substantially in a direction parallel with the shaft 11. The arm 14c of the second lever 14 is securely connected to one end of a wire 19, the other end of which is connected to the accelerator lever 6.

A pulley 20 is fixedly mounted on one end of the shaft 11 which is rotatably supported by a pair of bearings 12. A third lever 21 is securely fixed to the pulley 20 for integral rotation therewith. The opposite ends of a wire 22, which is wrapped around the pulley 20 in its intermediate portion, are connected to the actuator 8. The actuator 8 is, for example, an electric motor which is operated by control signals from the radio controller to rotate the pulley 20 in the forward or reverse direction through the wire 22, rotating the third lever 21 in the forward or reverse direction.

Figure 5A:
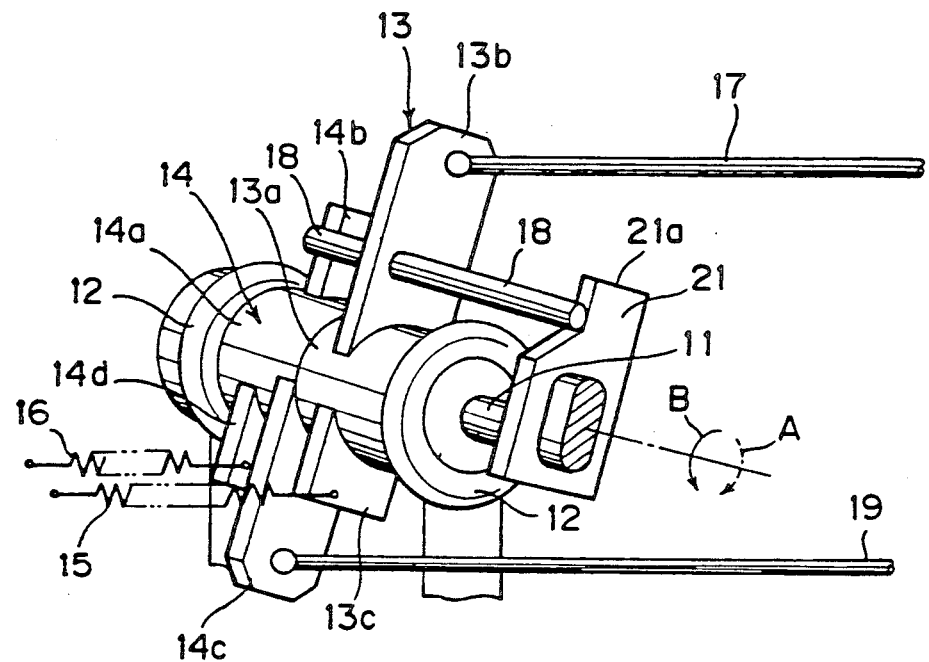
FIGS. 5A to 5C are perspective views explanatory of the operation of the embodiment of the invention.
Figure 5B:
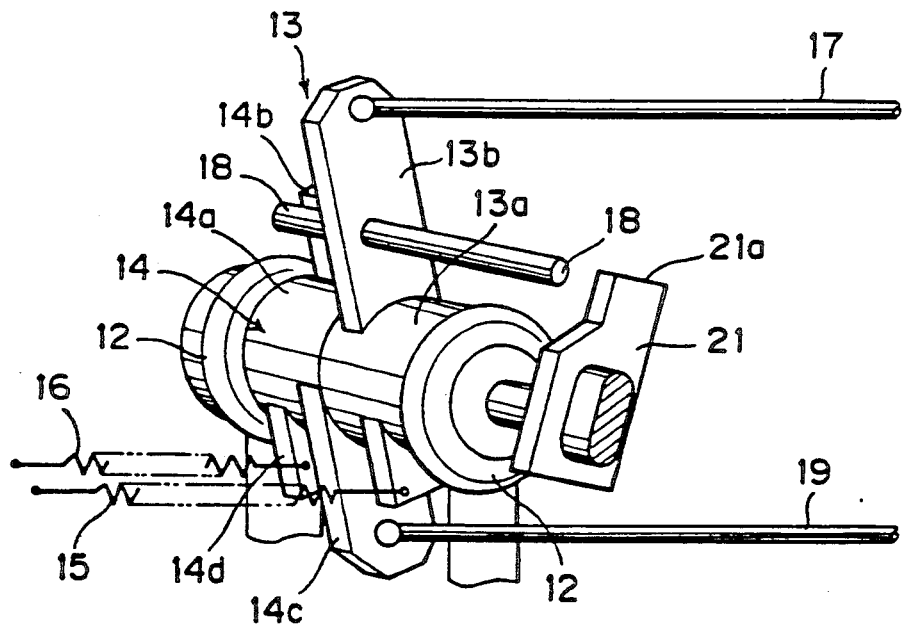
Figure 5C:
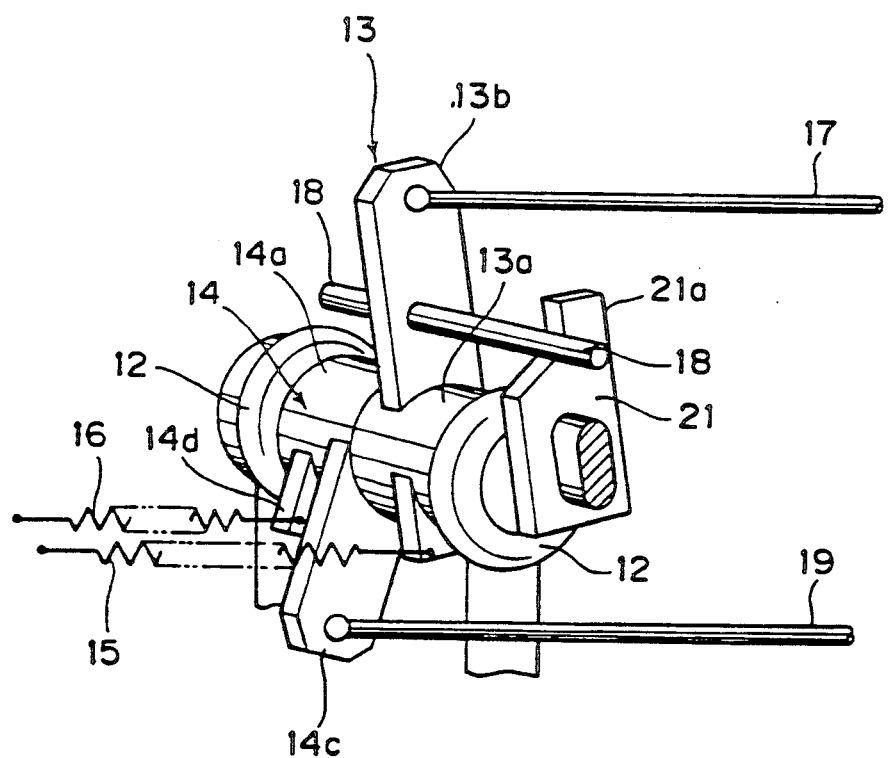

Referring to FIGS. 5A to 5C, the main controller 7 operates in the manner as follows.

FIG. 5A shows a low idling state of the engine. Namely, in this state, the accelerator lever 6 has been turned in a direction of slackening the wire 19, and the second lever 14 is biased by the spring 16 to turn in the direction A, that is, in the clockwise direction. The first lever 13 is biased by the spring 15 to turn in the clockwise direction, so that the rod 18 which is fixed to the arm 13b is abutted against the arm 14b of the second lever 14 and an end portion 21a of the third lever 21. As a result, the wire 17 is in a slackened state to turn the governor lever 5 in the direction toward the low idling position, holding the engine in the low idling position.

As the accelerator lever 6 is turned from the position of FIG. 5A in the direction of increasing the rotational speed of the engine, the second lever 14 is turned by the wire 19 in the direction B or in the counterclockwise direction against the biasing force of the spring 16. At this time, the arm 14b of the second lever 14 interferes with the rod 18, which is fixed to the first lever 13, turning the first lever 13 counterclockwise against the biasing force of the spring 15. As a consequence, the governor lever 5 is turned by the wire 17 in the direction of increasing the rotational speed of the engine. This state is illustrated in FIG. 5B.

Upon returning the lever 6 to the initial position, the wire 19 is slackened and the second lever 14 is turned clockwise under the influence of the biasing force of the spring 16. Concurrently, the first lever 13 is turned clockwise by the biasing force of the spring 15 and the governor reaction, thereby turning the governor lever 5 in the direction of reducing the rotational speed of the engine.

On the other hand, in order to increase the rotational speed of the engine through operation of the radio controller, a corresponding radio wave command is transmitted to the actuator 8 from the radio controller to rotate the pulley 20 counterclockwise through the wire 22 together with the third lever 21 which is integrally fixed to the pulley 20. At this time, the end portion 21a of the third lever 21 interferes with the rod 18, which is fixed to the first lever 13, turning the first lever 13 counterclockwise against the biasing force of the spring 15. As a result, the governor lever 5 is turned in the direction of increasing the engine speed. This state is illustrated in FIG. 5C.

In order to reduce the rotational speed of the engine by the radio controller, the actuator 8 is rotated by a radio wave command to rotate the pulley 20 and third lever 21 clockwise through the wire 22. As the third lever 21 is rotated clockwise, the first lever 13 is also rotated clockwise under the influence of the biasing force of the spring 15, turning the governor lever 5 in the direction of reducing the rotational speed of the engine.

Although the shaft 11 is rotatably supported by the paired bearings 12 in the foregoing embodiment, there may be employed an arrangement in which the shaft 11 is supported fixedly while the pulley 20 and third lever 21 are rotatably mounted on the fixed shaft 11. The actuator 8 is not restricted to the electric motor which has been shown as an example, and may be an actuator of a different form such as a hydraulic cylinder or the like which is arranged to rotate the third lever 21.

In the foregoing embodiment, the accelerator lever 6 is connected to the governor lever 5 through the wire 19, second lever 14, first lever 13 and wire 17, while the actuator 8 is connected to the governor lever 5 through the wire 22, pulley 20, third lever 21, first lever 13 and wire 17. The transmission system employing wires in this manner is highly reliable with less susceptibility to troubles as compared with an electric type or fluid type transmission system, and should a trouble occur to the transmission system, it is unlikely to develop into a serious one which makes the engine control utterly infeasible. Further, since the transmission system by the radio controller is provided in addition to the mechanical transmission system via the accelerator lever 6, one can continue operation even in the event of a trouble in one of the two transmission systems.

What is claimed is:

1. An engine controller for controlling rotational speed of an engine, comprising:
    a governor for adjusting the rotational speed of the engine;
    an accelerator means provided in an operator's station;
    an actuator adapted to be operated by radio control;
    a shaft;
    a support means for said shaft;
    a first lever means rotatably supported on said shaft;
    a first biasing means adapted to bias said first lever means to turn in one direction;
    a second lever means rotatably supported on said shaft;
    a second biasing means adapted to bias said second lever means to turn in said one direction;
    a pulley mounted on said shaft;
    a third lever means fixedly secured to said pulley;
    a first wire means operativebly connecting said first lever means with said governor, said first wire means being linked to said first lever means in such a manner as to increase the engine speed when said first lever means is turned in the opposite direction to said one direction;
    a second wire means operativebly connecting said second lever means with said accelerator means, said second wire means being linked to said second lever means in such a manner as to turn said second lever means in the opposite direction when said accelerator means is operated in the direction of acceleration;
    a third wire means operativebly connecting said pulley with said actuator in such a manner as to rotate said pulley in said one direction or in said opposite direction according to the rotation of said actuator; and
    a rotation transmitting means adapted to transmit rotation to said first lever means to rotate same in the opposite direction when at least one of said second and third lever means is rotated in the opposite direction.

2. An engine controller as defined in claim 1, wherein said shaft is rotatably supported by said support means, and said pulley is fixedly mounted on said shaft.

3. An engine controller as defined in claim 1, wherein said shaft is non-rotatably supported by said support means, and said pulley is rotatably mounted on said shaft.

4. An engine controller as defined in claim 1, wherein said first lever means includes a first boss rotatably fitted on said shaft, and first and second arms securely fixed to said first boss to extend radially in opposite directions, said first arm being connected to said governor, said second arm being connected to said first biasing means, and said rotation transmitting means being a rod member securely fixed to said first arm to extend substantially at right angles therewith.

5. An engine controller as defined in claim 4, wherein said second lever means includes a second boss rotatably fitted on said shaft, a third arm securely fixed to said second boss to extend in the same direction as said first arm, and an arm means securely fixed to said second boss to extend in the same direction as said second arm, said third arm being adapted to interfere with said rod member, and said second biasing means and said second wire means being connected to said arm means from opposite directions.

6. An engine controller as defined in claim 5, wherein said arm means includes fourth and fifth arms, said second biasing means being connected to said fourth arm, and said second wire means being connected to said fifth arm.

* * * * *